Figure 1:
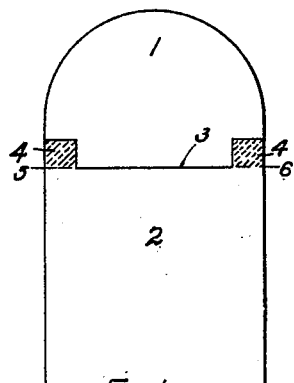

No. 631,803. Patented Aug. 29, 1899.
F. MALLALIEU.
MANUFACTURE OF INFLATABLE TUBES.
(Application filed Apr. 15, 1897.)

(No Model.)

WITNESSES
Ira L Fish
Q. A. Oates

INVENTOR
Frank Mallalieu,
BY Wilmarth H. Thurston,
Attorney.

THE NORRIS PETERS CO., PHOTO-LITHO., WASHINGTON, D. C.

UNITED STATES PATENT OFFICE.

FRANK MALLALIEU, OF PROVIDENCE, RHODE ISLAND, ASSIGNOR TO THE MECHANICAL FABRIC COMPANY, OF SAME PLACE.

MANUFACTURE OF INFLATABLE TUBES.

SPECIFICATION forming part of Letters Patent No. 631,803, dated August 29, 1899.

Application filed April 15, 1897. Serial No. 632,210. (No model.)

*To all whom it may concern:*

Be it known that I, FRANK MALLALIEU, of the city and county of Providence, State of Rhode Island, have invented certain new and useful Improvements in the Manufacture of Inflatable Tubes; and I do hereby declare the following specification, taken in connection with the accompanying drawings, forming a part of the same, to be a full, clear, and exact description thereof.

Certain features of the present invention relate to the manufacture of inflatable tubes, and more especially to rubber tubes used as air-tubes in double-tube pneumatic tires. In this class of tubes heretofore in common use the ends of the tubes have been closed by securing the inner walls of the tube to each other, thus forming a non-inflatable or dead part at the ends of the tube. Moreover, with the ends of the tube closed in the above manner the pressure of the air in the tube tends to spread the walls of the tube where they are secured together, and thus cause leakage at this point.

One of the objects of the present improvements is to close the ends of the tubes in such a manner that the tube may be inflated throughout substantially its entire length, with the result that there is no dead part at the end of the tube to interfere with the resiliency of the tube when in place in the outer tube of the tire.

A further object of the present improvements is to close the ends of the tube in such a manner that the pressure of the air has no spreading action, tending to strip the secured surfaces from each other, but merely tends to slide the secured surfaces upon each other, with the result that the closure will resist a much greater force and will be less liable to become defective than would otherwise be the case.

The invention accordingly consists in certain improvements in the method of closing the end of an inflatable tube and also in the tube produced by such method, as will be more fully set forth in the claims.

The further features of invention will be hereinafter described, and set forth in the claims.

In employing the present improvements a flap is formed at the end of the tube having ears or lips thereon at or near the ends of the fold-line, which ears or lips are secured to said flap, thus guarding against any possibility of leakage at these points. The flap is then folded over the end of the tube and secured thereto. If desired, an auxiliary flap may be employed, which is narrower than the main flap and lies between the ears formed on said main flap. In this case the auxiliary flap is first folded within the tube and secured to the opposite wall thereof. The surfaces of the rubber may be secured together in any desired manner either before or after vulcanization; but it is preferred to vulcanize the tube before closing its ends and to use cement in forming the closure.

In the accompanying drawings I have shown two forms of closures which embody the present improvements; but it will be understood that the invention is not limited to such forms, which are shown merely to illustrate applications of the invention.

Figure 2:
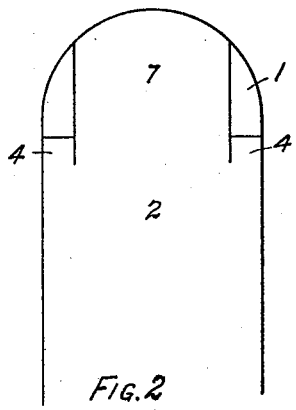
Figure 1A:
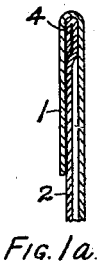
Figure 3:
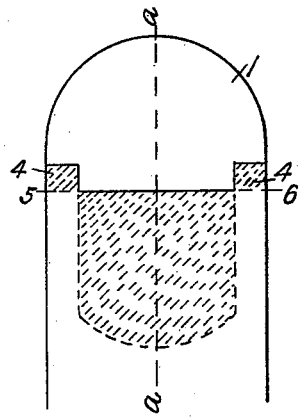
Figures 4, 5:
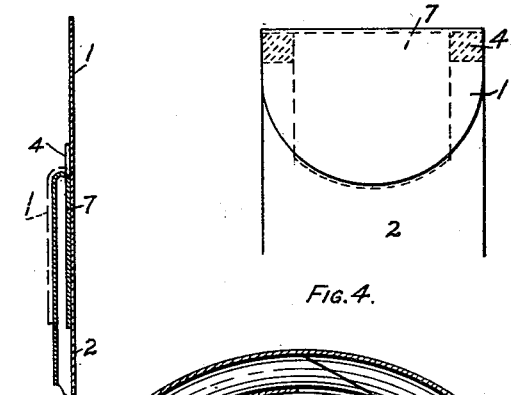
Figure 6:
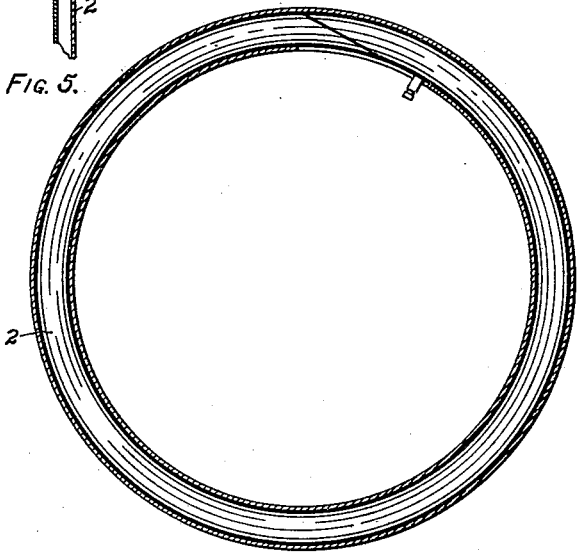

Figure 1 is a view showing the end of a tube provided with a single flap. Fig. 1ª is a sectional view showing the flap folded over the end of the tube. Figs. 2 to 4 are views showing the end of a tube provided with two flaps, a main flap and an auxiliary flap, the several views representing different stages of the process. Fig. 5 is a sectional view on line $aa$, Fig. 3. Fig. 6 is a view showing a double-tube tire with the inner tube in place.

Referring to Fig. 1, 2 represents a tube provided with a flap 1, having the ears or lips 4 formed at the ends of its fold-line. In closing the end 3 of the tube the ears 4 are first secured to the flap 1, preferably by cement, as indicated by dotted lines. The flap 1 is then folded over the end of the tube, preferably on the line 5 6, and secured thereto.

Referring to Figs. 2, 3, 4, and 5, the tube 2 is also provided with an auxiliary flap 7, which is narrower than the main flap 1 and which is located between the ears 4. In this case the closure is made in the same manner as before, the flap 7 being first folded within the tube 2 and secured to the opposite wall of the tube, as shown in Fig. 5.

What I claim as my invention, and desire to secure by Letters Patent, is—

1. The improvement in forming inflatable tubes consisting in forming a flap at the end of the tube, said flap having ears at or near the ends of its fold-line, securing said ears to the flap, and folding said flap over the end of the tube and securing it thereto, substantially as described.

2. The improvement in forming inflatable tubes consisting in forming a main and an auxiliary flap at the end of the tube, said main flap having ears at or near the ends of the fold-line, folding the auxiliary flap within the tube and securing it to the opposite wall of the tube, securing said ears to the main flap, and folding said main flap over the end of the tube and securing it thereto, substantially as described.

3. An inflatable tube provided at its end with a flap folded over the end of the tube and secured thereto, said flap having ears or lips at or near the ends of its fold-line which are secured to said flap, substantially as described.

4. An inflatable tube provided at its end with an auxiliary flap folded within the tube and secured to the opposite wall and a main flap folded over the end of the tube and secured thereto, said main flap having ears at or near the ends of its fold-line which are secured to said flap, substantially as described.

FRANK MALLALIEU.

Witnesses:
R. A. BATES,
IRA L. FISH.